United States Patent
Grillion (10) Patent No.: US 8,336,770 B2
(45) Date of Patent: Dec. 25, 2012

(54) METHOD AND APPARATUS FOR WIRELESS AUTHORIZATION

(75) Inventor: Robert John Grillion, Wentzville, MO (US)

(73) Assignee: MasterCard International, Inc., Purchase, NY (US)

( * ) Notice: Subject to any disclaimer, the term of this patent is extended or adjusted under 35 U.S.C. 154(b) by 196 days.

(21) Appl. No.: 11/586,819

(22) Filed: Oct. 26, 2006

(65) Prior Publication Data

US 2008/0099552 A1    May 1, 2008

(51) Int. Cl.
    *G06K 5/00*    (2006.01)
(52) U.S. Cl. .................................. 235/380; 235/375
(58) Field of Classification Search .............. 235/375, 235/380, 379
    See application file for complete search history.

(56) References Cited

U.S. PATENT DOCUMENTS

| | | | | |
|---|---|---|---|---|
| 4,001,550 | A * | 1/1977 | Schatz | 235/379 |
| 4,701,601 | A * | 10/1987 | Francini et al. | 235/449 |
| 4,734,564 | A * | 3/1988 | Boston et al. | 235/380 |
| 4,766,293 | A * | 8/1988 | Boston | 705/41 |
| 5,708,422 | A * | 1/1998 | Blonder et al. | 340/5.41 |
| 5,773,804 | A * | 6/1998 | Baik | 235/379 |
| 5,917,168 | A * | 6/1999 | Nakamura et al. | 235/379 |
| 6,076,075 | A * | 6/2000 | Teicher | 705/41 |
| 6,282,523 | B1 * | 8/2001 | Tedesco et al. | 705/45 |
| 6,453,301 | B1 * | 9/2002 | Niwa | 705/26 |
| 7,336,973 | B2 * | 2/2008 | Goldthwaite et al. | 455/558 |
| 7,765,162 | B2 * | 7/2010 | Binder et al. | 705/66 |
| 2001/0034717 | A1 * | 10/2001 | Whitworth | 705/64 |
| 2001/0049636 | A1 * | 12/2001 | Hudda et al. | 705/26 |
| 2002/0062286 | A1 * | 5/2002 | Tedesco et al. | 705/45 |
| 2002/0116329 | A1 * | 8/2002 | Serbetcioglu et al. | 705/39 |
| 2003/0014633 | A1 * | 1/2003 | Gruber | 713/170 |
| 2003/0126076 | A1 * | 7/2003 | Kwok et al. | 705/40 |
| 2004/0019564 | A1 * | 1/2004 | Goldthwaite et al. | 705/44 |
| 2004/0087339 | A1 * | 5/2004 | Goldthwaite et al. | 455/558 |
| 2004/0127256 | A1 * | 7/2004 | Goldthwaite et al. | 455/558 |
| 2004/0128256 | A1 * | 7/2004 | Krouse et al. | 705/65 |
| 2004/0230489 | A1 * | 11/2004 | Goldthwaite et al. | 705/26 |
| 2004/0267673 | A1 * | 12/2004 | Ballard et al. | 705/77 |
| 2005/0055316 | A1 * | 3/2005 | Williams | 705/65 |
| 2005/0131838 | A1 * | 6/2005 | Woodward | 705/71 |
| 2005/0182674 | A1 * | 8/2005 | Yeo | 705/13 |
| 2005/0184145 | A1 * | 8/2005 | Law et al. | 235/380 |
| 2005/0278222 | A1 * | 12/2005 | Nortrup | 705/17 |
| 2006/0000900 | A1 * | 1/2006 | Fernandes et al. | 235/380 |
| 2006/0004658 | A1 * | 1/2006 | Chau et al. | 705/40 |
| 2006/0012473 | A1 * | 1/2006 | Bishop et al. | 340/539.1 |
| 2006/0206709 | A1 * | 9/2006 | Labrou et al. | 713/167 |
| 2007/0063027 | A1 * | 3/2007 | Belfer et al. | 235/381 |
| 2007/0170243 | A1 * | 7/2007 | Desany et al. | 235/379 |
| 2008/0041937 | A1 * | 2/2008 | Vawter | 235/380 |
| 2008/0073426 | A1 * | 3/2008 | Koh et al. | 235/380 |

* cited by examiner

*Primary Examiner* — Daniel Hess
*Assistant Examiner* — Paultep Savusdiphol
(74) *Attorney, Agent, or Firm* — Buckley, Maschoff & Talwalkar LLC (57) ABSTRACT

A system, method, apparatus, means and computer program products for conducting wireless authorization include transmitting, from a transaction terminal to a payment card device, payment transaction data associated with a purchase transaction, associating an approval code stored in the payment card device with the payment transaction data, transmitting the approval code and the payment transaction data to a payment network to initiate a settlement of the purchase transaction, and transmitting the approval code to the transaction terminal to complete the purchase transaction.

17 Claims, 5 Drawing Sheets

METHOD AND APPARATUS FOR WIRELESS AUTHORIZATION

BACKGROUND

Embodiments disclosed herein relate to payment systems. In particular, some embodiments relate to methods, apparatus, systems, means and computer program products for performing wireless authorization of payment card transactions in a payment system.

The basic flow of payment card transactions for the last twenty years has been substantially unchanged. A payment card transaction begins when a cardholder presents a payment card (such as a credit card or debit card) to a merchant to complete a purchase transaction. The merchant either swipes a magnetic stripe on the card through a point of sale ("POS") device or otherwise enters payment card data (including, for example, the card number and expiration date) into a transaction terminal. The payment card data and transaction details (including the purchase amount) are transmitted from the transaction terminal to a transaction acquiring financial institution or processor (the "acquirer"). The acquirer either approves the transaction (e.g., by applying one or more stand in processing rules established by the payment card account issuer) or routes the transaction to the payment card account issuer (the "issuer") based on the payment card data.

In the situation where the acquirer is able to approve the transaction, the acquirer assigns an authorization or approval code to the transaction and returns an approval to the merchant via the transaction terminal and the purchase is completed. The acquirer settles with the issuer based on the transaction details and the authorization code.

In the situation where the acquirer is not able to approve the transaction, the issuer reviews the transaction details and payment card details and issues an approval or denial. If the transaction is approved, an authorization code is assigned to the transaction and is routed back to the merchant via the acquirer and the transaction terminal. In some situations, the transaction flow between the acquirer and the issuer is via a payment association network, such as MasterCard International's "BankNet" network. However, not all such transactions go through a payment association network. For example, currently, only about 40% of MasterCard® payment card transactions are routed through the BankNet network. It would be desirable to ensure that a greater number of such payment card transactions are processed by the payment card association.

BRIEF DESCRIPTION OF THE DRAWINGS

Features and advantages of some embodiments of the present invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein.

DETAILED DESCRIPTION

Applicant has recognized that there is a need for methods, systems, apparatus, means and computer program products for performing wireless authorization of payment card transactions in a payment system.

In some embodiments, a wireless authorization system is provided which allows a payment card cardholder to initiate a purchase transaction in which the cardholder's payment card device transmits transaction details directly to a payment card processing network which then sends the transaction information to the payment card issuer and the merchant's acquirer. In some embodiments, the cardholder device is a wireless device which communicates with a transaction terminal to obtain transaction information, provides an authorization or approval code to the transaction terminal, and then wirelessly transmits the transaction information to the payment card processing network. The result is a system that ensures that all transactions conducted by the system are routed through the payment card processing network, providing increased fraud controls, speed, and efficiency.

These and other features will be discussed in further detail below, by first describing a system, individual devices, exemplary databases and processes according to embodiments of the invention.

A number of terms will be used herein to describe features of some embodiments of the present invention. For example, as used herein, the term "payment card" is used to refer to a card or device that is issued by an issuer financial institution to a "cardholder" for use in making purchases of goods or services. A payment card may be a credit card, a debit card, a stored value card, or other card that is associated with a payment account and which allows the cardholder to access funds or credit to make a purchase of goods or services. A payment card may be issued pursuant to the rules of a card association such as MasterCard®, Visa®, American Express®, Discover® or the like.

As used herein, the term "payment card device" or "wireless payment device" refers to a device which is issued or held by a cardholder and which stores or contains payment card information. For example, a payment card device may be a cellular or wireless telephone that has been configured to contain client software pursuant to some embodiments of the present invention. The client software will be discussed further below, but in general, it may securely store payment card information associated with the cardholder. For example, the client software may securely store a payment card identifier or account number, an expiration date, and other information uniquely identifying one or more payment cards issued to the cardholder. In some embodiments, the client software may also store code allowing the wireless payment device to securely communicate with a payment card processing network to obtain approval codes and to transmit transaction information. As will be discussed further below, the wireless payment device allows a cardholder to conduct transactions with merchants in which the wireless payment device acts to approve the transaction. The wireless payment device may be any device capable of wirelessly communicating with a payment card network and with a transaction terminal.

As used herein, the term "acquirer" refers to a financial institution or financial institution processor that has a relationship with a merchant to acquire payment card transaction information and obtain settlement for transactions with an account issuer. As used herein, the term "issuer" refers to a financial institution or financial institution processor that issues payment card or other financial accounts to cardholders allowing the cardholders to access funds or credit in the account.

As used herein, the term "transaction terminal" refers to a device or system located at or in association with a merchant that allows customers to purchase goods or services using payment cards. A transaction terminal may be, for example, a point of sale ("POS") device, a software system, or the like that allows a merchant to obtain payment card data from a payment card device and to associate the payment card data with transaction data to complete a purchase transaction.

As used herein, the term "payment card network" refers to a network operated by or on behalf of a payment card association or system. For example, one payment card network is the BankNet® network operated by MasterCard®. Another example payment card network is the VisaNet® network operated by Visa®. In general, embodiments may operate with any payment card network that facilitates interaction between acquirers and issuers to authorize, deny or settle payment card transactions.

As used herein, the term "approval code" is used to refer to an identifier or code that is created by the payment card network for a transaction that is authorized or approved. As will be described herein, pursuant to some embodiments, individual "approval codes" may be preassigned and distributed to wireless payment devices for use in approving individual transactions. As used herein, the term "delegated authorization" is used to refer to an authorization rule that defines the situations in which an "approval code" may be used by a wireless payment device. These terms will be described further below. Other terms and descriptions will be provided below to aid in understanding features of some embodiments of the present invention.

Figure 1:
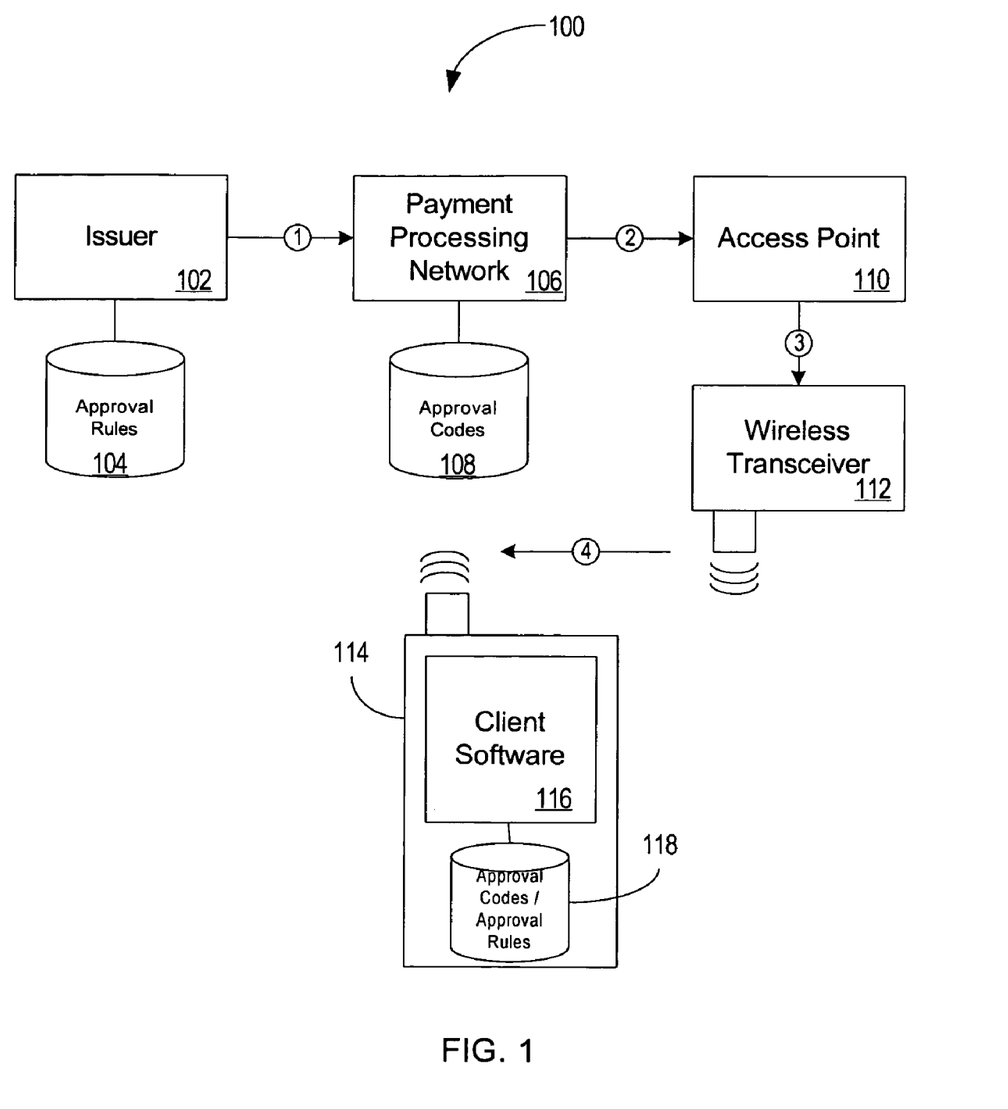
FIG. 1 is a block diagram illustrating a system according to some embodiments of the present invention.

Referring now to FIG. 1, a transaction authorization system 100 pursuant to some embodiments of the invention is shown. More particularly, FIG. 1 depicts devices and entities that interact to allow a payment card issuer 102 to delegate authorization to a wireless payment device 114 held by a payment card cardholder. As will be described, this delegated authorization includes creating and distributing one or more approval codes to a participating wireless payment device 114 so that the wireless payment device 114 may perform a delegated authorization of a payment card transaction at a merchant.

In the embodiment depicted in FIG. 1, transaction authorization system 100 includes a number of entities (not all of which may be shown), including an issuer 102 in communication with a payment processing network 106, an access point 110, a wireless transceiver 112, and a wireless payment device 114. A number of issuers 102, access points 110, wireless transceivers 112, and wireless payment devices 114 may be involved in a system interacting with each payment processing network 106. In the embodiment depicted, each of the devices and entities are in communication to issue, monitor and deliver one or more approval codes and approval rules to each wireless payment device 114.

Issuer 102 may be a financial institution or processor that issues payment accounts to cardholders. Issuer 102 may issue a number of payment accounts, each uniquely identified by a primary account number and/or other account identifying information. Some, or all, of the payment accounts issued by issuer 102 may be identified as being associated with a wireless payment device such as device 114. For some, or all, of these payment accounts, issuer 102 may create one or more delegated approval rules (e.g., shown as being stored or accessible in database 104) which are communicated to payment processing network 106 to control the issuance and distribution of one or more approval codes to wireless payment devices 114.

A delegated approval rule may be, for example, a rule that defines the type of transaction for which authorization may be delegated to wireless payment device 114 pursuant to embodiments of the present invention. As a specific illustrative example, a delegated approval rule may allow a particular payment card account (associated with a wireless payment device) to authorize a transaction that is below $50. As another specific illustrative example, a delegated approval rule may allow a particular payment card account to authorize up to $500 (or the current available credit or debit balance) in a single day. Issuer 102 may change these delegated approval rules each day (or throughout the day) based on the payment account's current available balance.

These delegated approval rules may be stored at or created by issuer 102 or they may be stored at or created by payment processing network 106 pursuant to guidance provided by issuer 102. In the case where they are stored at or created by issuer 102, they are communicated to payment processing network 106 via a network connection (marked as "1" in FIG. 1). This network connection (and others described herein) may be a wired or wireless network connection known in the art.

Payment processing network 106 is a network adapted to process, authorize and settle payment card (or other financial account) transactions. For example, payment processing network 106 may be the BankNet® network operated by MasterCard International. Payment processing network 106 typically issues authorization or approval codes in response to authorization requests received from merchants. Pursuant to some embodiments, approval codes are pre-established for selected payment accounts and distributed to wireless payment devices 114 for use in delegated approval of payment transactions. Approval codes may be stored at, or accessible to, a database 108 accessible to payment processing network 106. Each approval code may be associated with an individual payment card account (and an individual wireless payment device 114) and may also be associated with one or more delegated approval rules established by, or on behalf of, issuer 102. These approval codes are used in the settlement and processing of individual payment transactions involving participating payment card accounts.

On a regular (or, in some embodiments, on an on-demand) basis, approval codes and related delegated approval rules are delivered to individual wireless payment devices 114 for use in conducting payment transactions. For example, in some embodiments, approval codes and related delegated approval rules are delivered daily to individual wireless payment devices 114 so that each participating wireless payment device 114 has current code(s) and rule(s) for transactions conducted during the day.

Approval code(s) and related rule(s) are delivered to individual wireless payment devices 114 through an access point 110 (at communication link "2") and through a wireless transceiver 112 (at communication link "3"). Access point 110 may be a network server in communication with payment processing network 106 that is adapted to route messages to a wireless network. For example, a wireless payment device 114 that is a Sprint® network cellular phone may receive messages through one access point in communication with a Sprint network-compatible transceiver 112, while a wireless payment device 114 that is a Verizon® network cellular phone may receive messages through a second access point in communication with a Verizon network-compatible transceiver 112. In other embodiments, a single access point 110 may be in communication with each wireless network.

In either event, wireless transceiver 112 operates to transmit data to individual wireless payment devices 114 via a wireless connection at "4". Each wireless payment device 114 includes client software 116 and a data store 118 allowing it to receive, store and utilize approval codes and approval rules received from the payment processing network 106.

Wireless payment device 114 may be a cellular telephone, personal digital assistant ("PDA") or other device capable of receiving, storing, and using approval codes and approval rules pursuant to embodiments of the present invention. In some embodiments, the approval codes and approval rules are not accessible to the cardholder and, instead, are securely stored within memory of the wireless payment device 114 to prevent tampering. In some embodiments, each of the codes and rules are received via a secure messaging protocol and are digitally signed to prevent tampering.

Wireless transceiver 112 may be any of a number of different types of wireless communication devices allowing the transmission and receipt of data to and from wireless payment devices 114. For example, wireless transceiver 112 may be or include base stations, transmitters and related devices configured to transmit and receive wireless data in packets pursuant to a commonly-used protocol, such as "code division multiple access" (CDMA), "time division multiple access" (TDMA), "frequency division multiple access" (FDMA) or "global system for mobile communications" (GSM) protocols. Other wireless devices, networks and protocols may also be used so long as the devices, networks and protocols are capable of sending and receiving data from wireless payment devices 114 as described herein.

As used herein, some or all of the communication paths between devices may be network paths and may employ any of a number of different types and modes of communication, and may be for example, a Local Area Network (LAN), a Metropolitan Area Network (MAN), a Wide Area Network (WAN), a proprietary network, a Public Switched Telephone Network (PSTN), a Wireless Application Protocol (WAP) network, a wireless network, a cable television network, or an Internet Protocol (IP) network such as the Internet, an intranet or an extranet.

In summary, as shown in FIG. 1, transaction authorization system 100 pursuant to some embodiments, include a number of devices and entities interacting to cause one or more approval codes to be created (pursuant to rules established by issuer 102 and payment processing network 106) and disseminated to a plurality of wireless payment devices 114. Each wireless payment device 114 may then use the approval code(s) to conduct payment transactions pursuant to the present invention.

Figure 2:
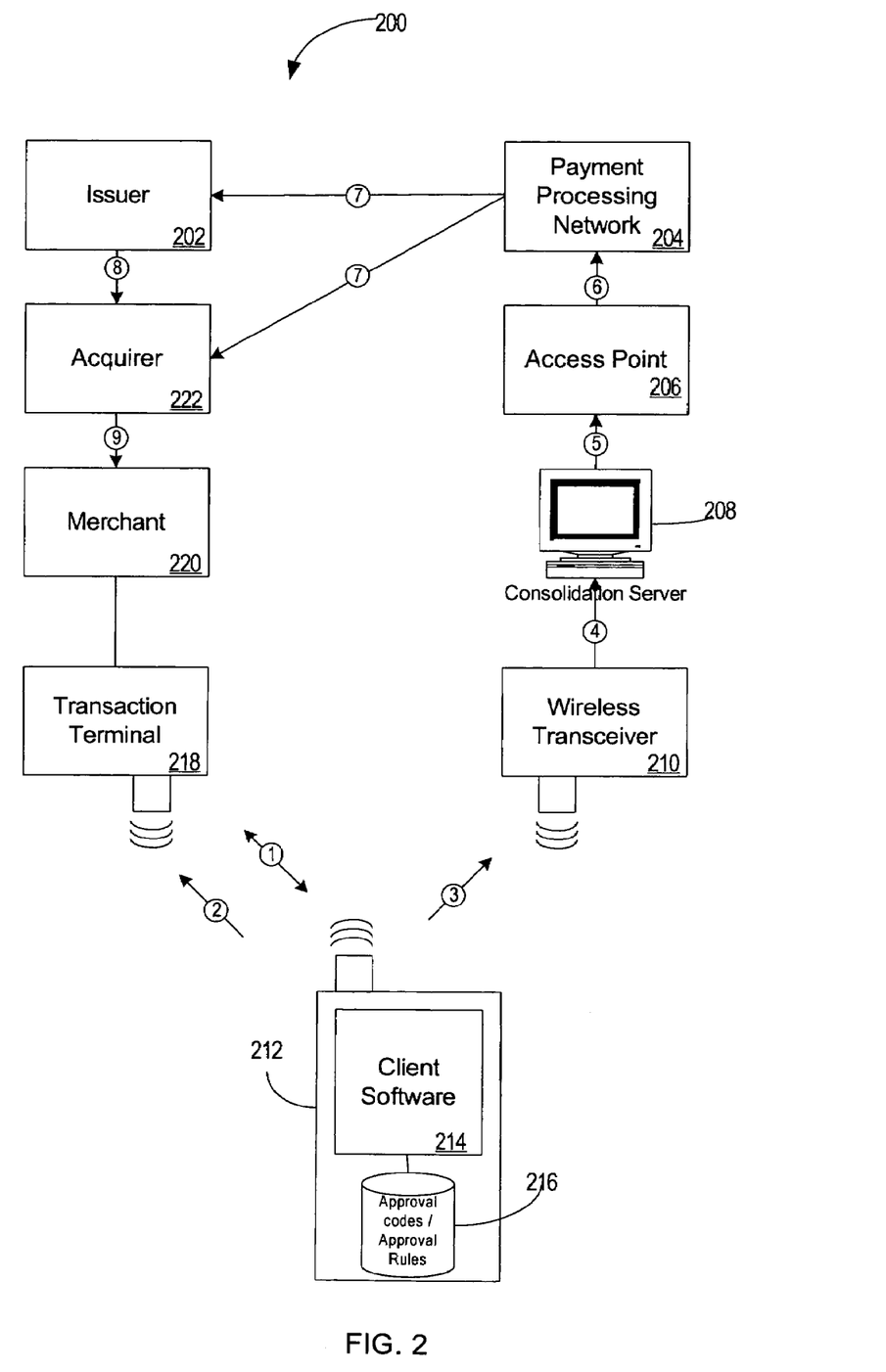
FIG. 2 is a block diagram illustrating a system according to some embodiments of the present invention.

Reference is now made to FIG. 2, where transaction authorization system 200 is shown with devices and entities interacting to allow a payment transaction to be performed pursuant to some embodiments of the present invention. Some of the entities or devices were introduced in FIG. 1, including issuer 202, payment processing network 204, access point 206, wireless transceiver 210, and wireless payment device 212. Several other devices or entities are shown in FIG. 2, including an acquirer 222 (which may be an acquirer financial institution or processor) having a relationship with a merchant 220. Merchant 220 operates or is associated with a transaction terminal 218 which is configured to perform purchase transactions involving payment cards. Also shown is a consolidation server 208 which processes data received from wireless payment device 212 so that the data can be transformed into a format for entry to payment processing network 204.

Any number or type of merchants 220 may be provided in a system of the present invention, including merchants having a brick and mortar retail presence, Internet or mail order merchants, or the like. In one embodiment, merchant 220 is a vendor having one or more point of sale transaction terminals 218 configured with an antenna allowing wireless communication with wireless payment devices 212 pursuant to the present invention. In some embodiments, communication between wireless payment device 212 and transaction terminal 218 is via a near-field wireless communication protocol, such as the Bluetooth® communication protocol or the like.

Transaction authorization system 200 will now be described by describing the flow of an illustrative transaction pursuant to some embodiments. In the illustrative transaction, one or more approval codes and/or approval rules have already been issued by issuer 202 and payment processing network 204 for the payment account associated with the wireless payment device 212. The approval codes and/or approval rules have also been communicated to, and stored in, datastore 216 of wireless payment device 212.

The illustrative transaction begins when the cardholder holding wireless payment device 212 selects goods or services to purchase from merchant 220 and takes the goods (either physically or in an Internet shopping cart, for example) to a checkout location. A store employee (or, in an Internet shopping example, an electronic shopping cart) sets up the purchase transaction by scanning in or entering product and transaction details (e.g., by scanning the product to be purchased), and ensures that the purchase transaction is available to receive information from wireless payment device 212. Wireless payment device 212 is then placed near or placed in an "payment" state and receives purchase transaction details (at "1") from transaction terminal 218. Code in client software 214 analyzes the purchase transaction to determine if the amount and type of transaction satisfies one or more approval rules stored in datastore 216. If the purchase transaction does not satisfy any approval rules, a "denial" message is returned to the transaction terminal 218 and the transaction may either be refused or may be routed through acquirer 222 for approval.

If the purchase transaction satisfies one or more approval rules, an approval code is selected from datastore 216 and is assigned to the purchase transaction. The purchase transaction details and assigned approval code are stored in datastore 216 for later processing, and the approval code and transaction details are returned (at "2") in an approval message to transaction terminal 218 to complete the transaction with the merchant 220.

The transaction details and approval code are then communicated to wireless transceiver 210 at "3" and are passed through consolidation server 208, and access point 206 into payment processing network 204 for further processing. Payment processing network 204 uses the payment transaction details and approval code to settle the transaction between the payment cardholder's issuing bank 202 and the acquiring bank 222 associated with merchant 220 so that the cardholder's account is debited (or the credit balance is reduced) and the merchant's account is credited with the transaction amount. Payment network 204 also manages the assessment and settlement of any transaction fees or interchange associated with the transaction.

Further, payment processing network 204, operating in conjunction with or under the direction of issuer 202, ensures that the payment card account associated with wireless payment device 212 is issued a new or replacement approval code and/or approval rule based on the payment account's new balance. For example, if the transaction described above was for a $300 purchase, and the payment cardholder's account now has a $200 available balance, a new approval code and/or approval rule may be generated and delivered to the wireless payment device 212 for use in a new payment transaction. In this manner, embodiments allow transactions to be conducted securely and accurately, while allowing them to be approved "off line" or by the wireless payment device 212. Further, all transaction details are effectively routed through payment processing network 204 allowing improved fraud and transaction control.

Figure 3:
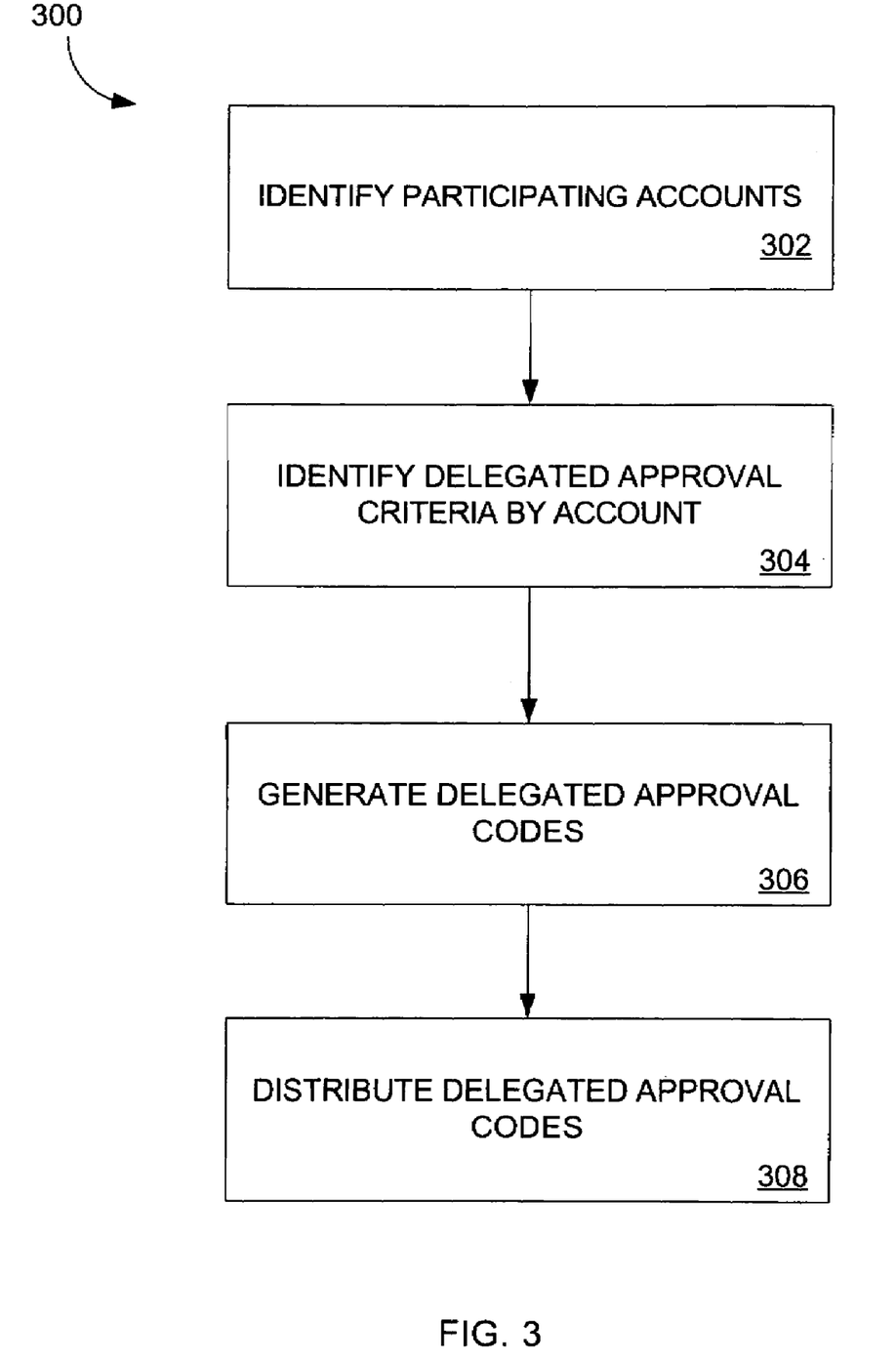
FIG. 3 is a flow diagram illustrating one embodiment of a process to issue approval codes pursuant to some embodiments of the present invention.

Reference is now made to FIG. 3, where a flow diagram shows an exemplary process 300 for issuing approval codes pursuant to some embodiments of the present invention. The particular arrangement of elements in the flow chart of FIG. 3 is not meant to imply a fixed order to the steps; embodiments of the present invention can be practiced in any order that is practicable. In one embodiment, some or all of the steps of process 300 are performed under the direction or control of the payment processing network described above.

Process 300 begins at 302 where a process is executed to identify participating accounts. For example, processing at 302 may include processing a file of payment accounts provided by one or more issuers who have elected to participate in the system of the present invention. Put another way, processing at 302 includes identifying one or more payment accounts that are to be issued one or more approval codes pursuant to the present invention.

Processing continues at 304 where delegated approval rules or criteria are identified for each of the payment accounts identified at 302. For example, different account issuers may have different delegated approval rules for their accounts. One issuer may allow delegated approval to be performed for all accounts and all payment amounts (assuming, of course, each account has sufficient credit for a desired payment amount). Another issuer, as an example, may only allow delegated approval to be performed for transactions under a set threshold—such as, for example, for payment transactions under $25.

In some embodiments, processing at 304 includes assigning different delegated approval rules to each individual account. For example, processing at 304 may include identifying a current available credit balance for each account, and then assigning the delegated approval rule based on that available balance and any other rules imposed by the account issuer. In some embodiments, processing at 304 may include assigning a common delegated approval rule to a plurality of accounts. For example, processing at 304 may include applying a pre-established delegated approval rule to all qualifying accounts (e.g., all accounts may be assigned a $25 delegated approval limit).

Processing continues at 306 where delegated approval codes are generated. In some embodiments, delegated approval codes may be digitally signed, or otherwise uniquely created, so that they may not be reused by any customer or device other than their intended payment card holder and related wireless payment device. In some embodiments, delegated approval codes may expire after a predetermined time period (e.g., delegated approval codes may be issued for a 24 hour period, or the like). In some embodiments, delegated approval codes may only be generated if the payment card holder does not currently have a delegated approval code on their wireless payment device.

In some embodiments, approval codes generated pursuant to some embodiments are generated such that they may be uniquely associated with individual payment cards. For example, an encryption or coding scheme may be used that takes one or more known data elements as input (such as the payment card account number, the date, an encryption key, or the like) to generate an approval code. The issuer, payment processing network, or other entity may then verify the authenticity and/or validity of an approval code by decrypting or decoding the approval code using one or more of the known data elements. In this manner, approval codes may be securely generated by a trusted authority (such as the issuer, payment processing network, or other entity) and associated with individual payment cards for use. The approval codes may then be verified and authenticated by the trusted authority when the codes are presented in a transaction.

In some embodiments, the approval codes may consist of several data elements, including a clear text element and a coded element. The clear text element may include a human or computer readable portion that shows, for example, a date or period of validity, some or all of the payment card account number, or the like. The coded element may be an encrypted or coded portion as described above. Other types of approval codes may be generated using techniques known in the art.

Processing continues at 308 where the approval codes generated at 306 are distributed to their associated wireless payment devices. In some embodiments, processing at 308 includes running a batch or near real-time process to cause the transmission of approval codes to individual wireless payment devices over one or more communication networks. In some embodiments, the communication is performed using secure messaging to ensure that each approval code is delivered (and stored) in the correct wireless payment device. Once a wireless payment device has been delivered, the payment card cardholder may use the approval code to conduct a transaction pursuant to the present invention.

Process 300 may be performed on a scheduled basis or on-demand (e.g., the process may be performed to replace used approval codes, or at other times requested by the issuer or payment cardholder).

Figure 4:
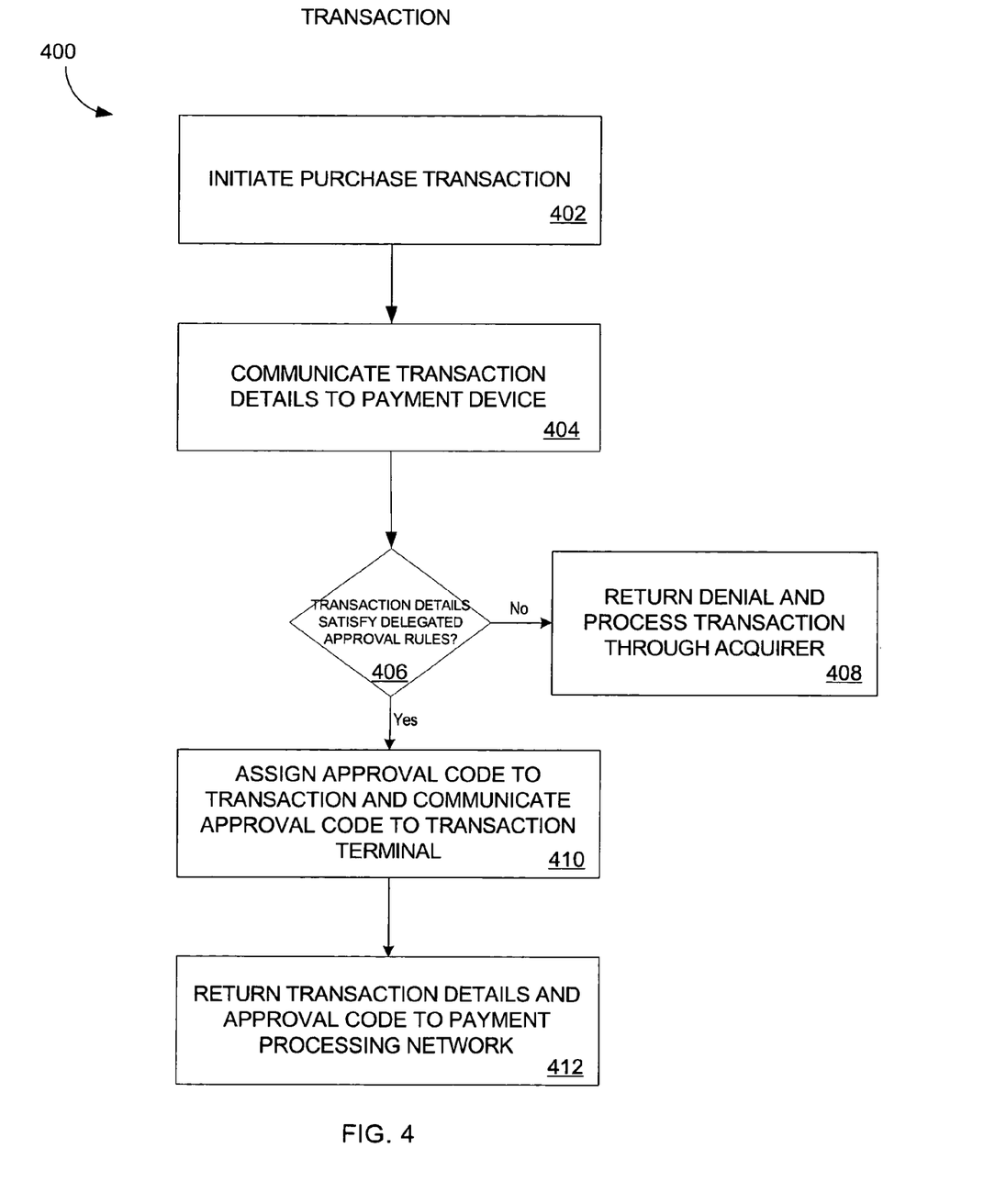
FIG. 4 is a flow diagram illustrating one embodiment of a transaction process pursuant to some embodiments of the present invention.

Reference is now made to FIG. 4, where a transaction process 400 pursuant to some embodiment is shown. Transaction process 400 may be performed once an approval code has been issued and distributed to a wireless payment device (e.g., after completion of the process 300 of FIG. 3).

Transaction process 400 begins at 402 where a purchase transaction with a merchant is initiated. For example, a payment cardholder having a wireless payment device (such as device 114 of FIG. 1) may visit a merchant and, at check out, may choose to complete the transaction using wireless payment device.

Processing continues at 404 where the transaction details are communicated from a transaction terminal to the wireless payment device. In some embodiments, this communication is over a near field communications protocol. At 406, software (such as client software 116) of the wireless payment device compares transaction details to one or more delegated approval rules to determine if the transaction can be approved by the wireless payment device. For example, the transaction amount may be compared to a delegated approval amount. If the transaction may not be approved by the wireless payment device, processing continues at 408 where a denial code is returned. In some embodiments, the transaction terminal may then attempt to secure authorization for the transaction using traditional authorization channels (e.g., by transmitting an authorization request through acquirer to issuer or the like).

If processing at 406 determines that the transaction may be authorized by the wireless payment device, processing continues at 410 where the client software of the wireless payment device assigns an available approval code to the transaction and causes the approval code to be communicated to the transaction terminal to complete the transaction. Again, in some embodiments, this communication may be over a near field communications channel between the wireless payment device and the transaction terminal.

The purchase transaction completes at 412 where the transaction details and approval code are returned to the payment processing network so that the transaction may be settled, and so that a further approval code may be issued and delivered to the wireless payment device.

Figure 5:
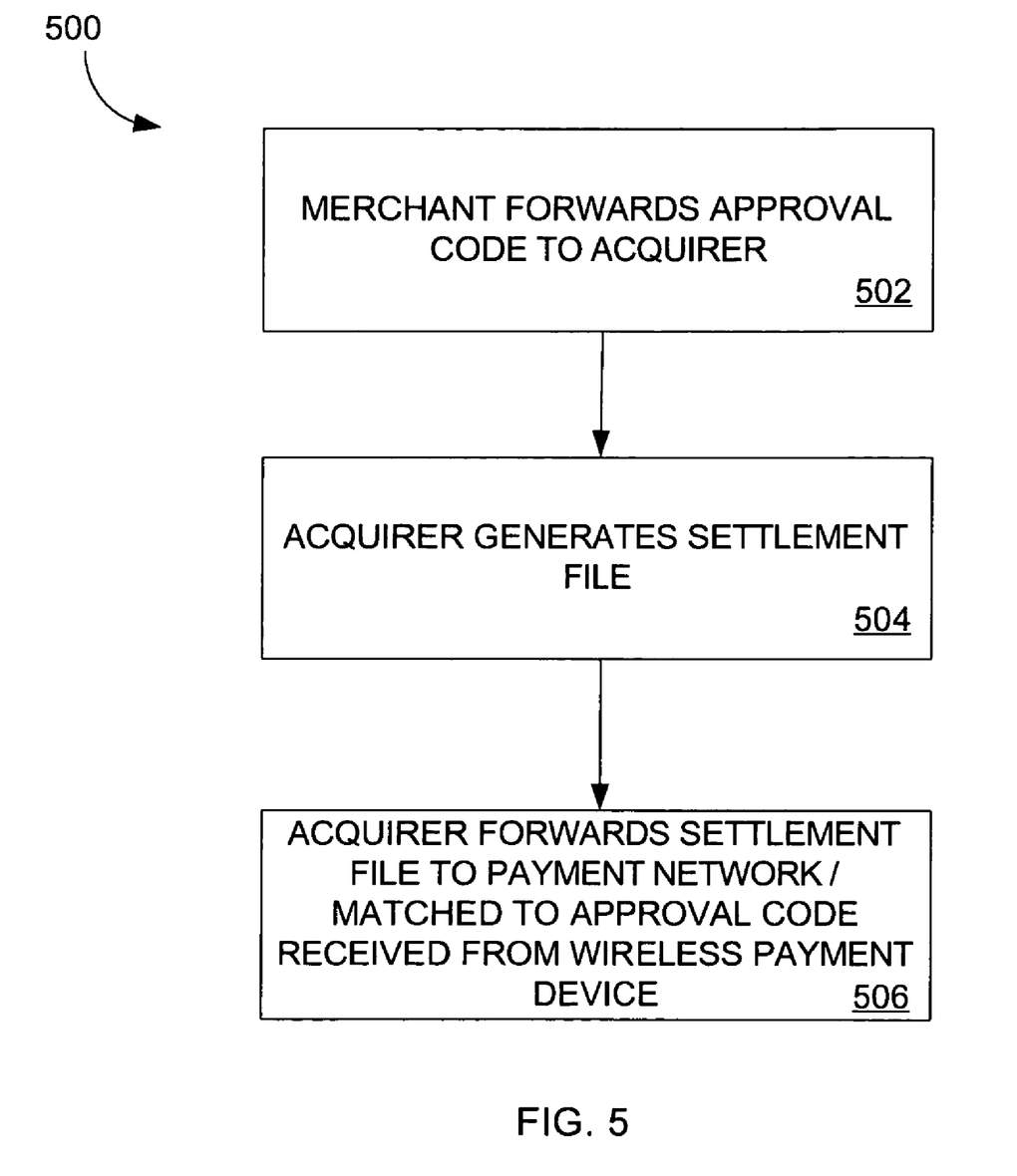
FIG. 5 is a flow diagram illustrating one embodiment of a settlement process pursuant to some embodiments of the present invention.

Reference is now made to FIG. 5, where a flow diagram shows an exemplary process 500 for settling transactions pursuant to some embodiments of the present invention. The particular arrangement of elements in the flow chart of FIG. 5 is not meant to imply a fixed order to the steps; embodiments of the present invention can be practiced in any order that is practicable. In one embodiment, some or all of the steps of process 500 are performed under the direction or control of the payment processing network described above.

The settlement process 500 starts upon completion of transaction process 400 discussed above. Settlement begins at 502 where the merchant forwards the approval code received from the wireless payment device to the merchant acquirer. The approval code may be transmitted via a network connection between the merchant transaction terminal system and the merchant acquirer. The approval code may be transmitted with other information, including the payment transaction information.

Processing continues at 504 where the merchant acquirer generates a settlement file for submission to the payment processing network. This settlement file may be generated on a daily basis and batch submitted to the payment processing network. In some embodiments, the settlement file may be generated on a more frequent basis. In some embodiments, processing at 504 may include receipt, by the acquirer, of an initial settlement file produced by the payment processing network based on approval codes received by the payment processing network from the wireless payment device.

Processing continues at 506 where the merchant acquirer transmits the settlement file to the payment processing network for matching to the approval code received from the wireless payment device. The payment processing network then uses information in the settlement file to perform settlement between the merchant acquirer and the issuer of the payment card so that the payment account at the issuer is debited for the transaction amount, and a merchant account at the acquirer is credited for an amount (possibly less transaction fees). The approval code is then deactivated or removed from the system and, in some embodiments, a new approval code is generated for delivery to the wireless payment device (e.g., using the process of FIG. 3).

The figures provided herein are block diagrams, flowcharts and control flow illustrations of methods, systems and program products according to some embodiments of the present invention. It will be understood that each block or step of the block diagrams, flowcharts and control flow illustrations, and combinations of blocks in the block diagrams, flowcharts and control flow illustrations, can be implemented by computer program instructions. These computer program instructions may be loaded onto a computer or other programmable apparatus to produce a machine, such that the instructions which execute on the computer or other programmable apparatus create means or devices for implementing the functions specified in the block diagrams, flowcharts or control flow block(s) or step(s).

These computer program instructions may also be stored in a computer-readable memory that can direct a computer or other programmable apparatus to function in a particular manner, such that the instructions stored in the computer-readable memory produce an article of manufacture, including instruction means or devices which implement the functions specified in the block diagrams, flowcharts or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagrams, flowcharts or control flow block(s) or step(s).

Accordingly, blocks or steps of the block diagrams, flowcharts or control flow illustrations support combinations of means or devices for performing the specified functions, combinations of steps for performing the specified functions and program instruction means or devices for performing the specified functions. It will also be understood that each block or step of the block diagrams, flowcharts or control flow illustrations, and combinations of blocks or steps in the block diagrams, flowcharts or control flow illustrations, can be implemented by special purpose hardware-based computer systems which perform the specified functions or steps, or combinations of special purpose hardware and computer instructions.

Although the present invention has been described with respect to example embodiments thereof, those skilled in the art will appreciate that various substitutions or modifications may be made without departing from the spirit and scope of the present invention.

What is claimed is:

1. A method, comprising:
    transmitting, from a transaction terminal to a payment card device, payment transaction data associated with a payment transaction;
    associating, by the payment card device, a transaction authorization approval code stored in said payment card device with said payment transaction data, said transaction authorization approval code being stored in said payment card device prior to said transmitting of said payment transaction data for authorizing the payment transaction, wherein the associating by the payment card device operates to authorize the payment transaction at the payment card device;
    transmitting, from said payment card device, said transaction authorization approval code and said payment transaction data to a first wireless receiver in communication with a payment network to initiate a settlement of said payment transaction; and
    transmitting, from said payment card device, said transaction authorization approval code to a second wireless receiver in communication with said transaction terminal to complete said payment transaction.

2. The method of claim 1, wherein said transaction authorization approval code is transmitted to said payment card device prior to said payment transaction.

3. The method of claim 2, wherein said transaction authorization approval code is transmitted to said payment card device from said payment network.

4. The method of claim 1, wherein said transmitting from said transaction terminal to said payment card device is conducted over a wireless network.

5. The method of claim 4, wherein said wireless network is at least one of a cellular network, a near-field communication network, and a Bluetooth® network.

6. The method of claim 1, wherein said transmitting said transaction authorization approval code and said payment transaction data to a payment network from said payment card device is conducted over a wireless network.

7. The method of claim 6, wherein said wireless network is a cellular network.

8. The method of claim 1, wherein said transmitting, from said payment card device, said approval code and said payment transaction data to a payment network further comprises:
   transmitting said transaction authorization approval code and said payment transaction data to a wireless transceiver connected to an access point of said payment network.

9. The method of claim 1, wherein said transaction authorization approval code is associated with at least a first approval condition, and said associating said transaction authorization approval code with said payment transaction data further comprises:
   determining that said payment transaction data complies with said at least first approval condition.

10. The method of claim 1, wherein said payment card device further stores at least one denial code used when said payment transaction data fails to comply with said at least first approval condition.

11. The method of claim 1, wherein said transaction authorization approval code is issued to said payment card device by said payment card network with at least a first approval condition.

12. The method of claim 11, wherein said transaction authorization approval code is issued to said payment card device on a scheduled basis.

13. A wireless payment device, comprising:
   a processor;
   a wireless transceiver coupled to said processor; and
   a memory unit in communication with said processor and storing at least a first transaction authorization approval code and a program, wherein the processor is operative with said program to:
      receive payment transaction data associated with a payment transaction from a first wireless transmitter in communication with a transaction terminal;
      compare said at least first transaction authorization approval code with said payment transaction data to determine if an authorization for said payment transaction at said wireless payment device based on said at least a first transaction authorization approval code stored in the memory unit, wherein said at least first stored transaction authorization approval code is stored in the memory unit prior to receiving of the payment transaction data;
      transmit said at least first transaction authorization approval code to a first wireless receiver in communication with said transaction terminal to complete said payment transaction; and
      transmit said at least first transaction authorization approval code to a second wireless receiver in communication with a payment network.

14. The wireless payment device of claim 13, wherein said at least first transaction authorization approval code is transmitted to said payment network over a cellular network.

15. The wireless payment device of claim 13, wherein said payment transaction data is received from said transaction terminal over a wireless connection.

16. A payment system, comprising:
   a payment network in communication with a second wireless receiver;
   a plurality of transaction terminals in communication with a first wireless receiver; and
   a plurality of wireless payment devices, including a first wireless payment device storing a first transaction authorization approval code issued by said payment network prior to a payment transaction, said first wireless payment device operable to authorize a payment transaction associated with a first transaction terminal, wherein said first wireless payment device authorizes said payment transaction at said first wireless payment device based on at least said first transaction authorization approval code stored by the first wireless payment device by comparing terms of said payment transaction to said first transaction authorization approval code and communicating said first transaction authorization approval code to said first transaction terminal and said wireless payment device transmits said at least first transaction authorization approval code to said second wireless receiver in communication with said payment network.

17. The payment system of claim 16, wherein said first transaction authorization approval code is communicated to said first wireless payment device over a wireless network.

* * * * *